(12) United States Patent
Rowe

(10) Patent No.: US 9,284,755 B2
(45) Date of Patent: Mar. 15, 2016

(54) SYSTEM FOR REMOTELY CHECKING LOCKED STATUS OF A VEHICLE

(71) Applicant: Ingenuity Automotive, LLC, Tallahassee, FL (US)

(72) Inventor: Russell Brian Rowe, Tallahassee, FL (US)

(73) Assignee: Ingenuity Automotive, LLC, Tallahassee, FL (US)

( * ) Notice: Subject to any disclaimer, the term of this patent is extended or adjusted under 35 U.S.C. 154(b) by 0 days.

(21) Appl. No.: 14/548,086

(22) Filed: Nov. 19, 2014

(65) Prior Publication Data

US 2016/0010366 A1    Jan. 14, 2016

Related U.S. Application Data

(60) Provisional application No. 62/022,870, filed on Jul. 10, 2014.

(51) Int. Cl.
| | |
|---|---|
| *B60R 25/04* | (2013.01) |
| *E05B 81/72* | (2014.01) |
| *G07C 9/00* | (2006.01) |
| *E05B 83/36* | (2014.01) |

(52) U.S. Cl.
CPC .............. *E05B 81/72* (2013.01); *E05B 83/36* (2013.01); *G07C 9/00309* (2013.01); *G07C 9/00896* (2013.01); *G07C 2009/00507* (2013.01); *G07C 2009/00769* (2013.01); *G07C 2009/00984* (2013.01)

(58) Field of Classification Search
CPC ......... E05B 81/36; E05B 81/72; E05B 81/78; G07C 9/00309; B60R 16/027
See application file for complete search history.

(56) References Cited

U.S. PATENT DOCUMENTS

| | | | |
|---|---|---|---|
| 5,900,823 A | 5/1999 | Coll-Cuchi | |
| 5,933,085 A * | 8/1999 | Holcomb | F24F 11/001 165/200 |
| 6,259,362 B1 | 7/2001 | Lin | |
| 6,703,919 B2 | 3/2004 | Baset | |
| 7,504,931 B2 | 3/2009 | Nguyen | |
| 7,650,864 B2 | 1/2010 | Hassan et al. | |
| 7,898,382 B2 | 3/2011 | Berstis et al. | |
| 8,299,894 B1 | 10/2012 | Semeniuk | |
| 8,319,605 B2 | 11/2012 | Hassan et al. | |
| 8,362,898 B2 | 1/2013 | Berstis et al. | |
| 2005/0099275 A1 | 5/2005 | Kamdar et al. | |
| 2006/0138866 A1* | 6/2006 | Bergmann | E05B 81/78 307/10.5 |
| 2008/0129448 A1 | 6/2008 | Reichling | |

* cited by examiner

*Primary Examiner* — Nabil Syed
(74) *Attorney, Agent, or Firm* — Lanier Ford Shaver & Payne, P.C.; Ann I. Dennen

(57) ABSTRACT

A system for detecting the locked status of a vehicle having an electrical power door lock system includes a status transmitter configured to transmit a signal indicating when the vehicle is in a locked status having at least an input that is connected to the vehicle system to detect a voltage indicating a command to lock all vehicle doors. A remote receiver is responsive to the status transmitter and is configured to indicate whether the vehicle is in a locked status based upon the transmitter signal.

9 Claims, 5 Drawing Sheets

SYSTEM FOR REMOTELY CHECKING LOCKED STATUS OF A VEHICLE

CROSS-REFERENCE TO RELATED APPLICATIONS

This application claims priority under 35 U.S.C. §119(e) to U.S. Provisional Patent Application Ser. No. 62/022,870, filed on Jul. 10, 2014, and incorporated by reference as fully set forth herein.

BACKGROUND

1. Field

The present disclosure relates generally to power door lock systems for vehicles.

2. Description of the Problem and Related Art

Today "multi-tasking" is the normal mode of operation. The act of shopping or going to a doctor appointment could involve collecting items to return to the store, making sure that all the required documentation is in hand, installing a sun shade behind the windshield, hiding valuables left in the car, transferring a child to a stroller, completing a cell phone call, making sure the child has juice and toys, and then, when you are walking in the mall or are being seen by the doctor, the thought hits you—"Did I lock the car?"

Reminder devices have been developed, but these are "dumb" devices which are not fool-proof. For example, U.S. Pat. No. 8,242,922, to Varasteh, teaches a reminder device including a controller, a switch, and an annunciator. The device may be adhered over the "lock" button on a remote car lock fob. When a user presses the "lock" button and closes the switch, the controller turns on the annunciator for a fixed period of time, for example, two hours to ten hours. The annunciator may be a light source such as a flashing LED or an audio indicator. The signal from the annunciator is intended to communicate to a user that the car door has been locked. However, if the user pushes the "lock" button while out of range of the car, or pushes the "unlock" button after locking a car door, the annunciator will erroneously indicate that the car door has been locked. Further, the "dumb" annunciator remains activated for a fixed period of time. This fixed period of activation results in two problems. First, the annunciator is draining the battery during the entire pre-programmed period of annunciation. Second, if the user desires to verify the locked condition of the vehicle after the pre-programmed period, e.g., after a party or after sleeping overnight, the device cannot provide an answer. Further, the annunciator will indicate that the doors are locked even in the event that there is an electrical malfunction of the door locking system, or if a door is mechanically not fully closed preventing engagement of one or more of the locks.

A user may enter a house and only then decide to lock the vehicle. Pushing the remote vehicle lock button would trigger any of the available "dumb" reminders, but there would be no guarantee that the remote signal actually reached the vehicle and resulted in locking of the door.

U.S. Pat. No. 6,703,919, to Baset, teaches a system for confirming the lock status for a vehicle that consists of a prior art vehicle anti-theft system that is configured to energize the vehicles exterior lights or horn in response to a command from a remote keyless entry device. The remote device includes a lock button, a unlock button and a trunk open button. The remote device is further configured with a LED which shows status of the lock button and with control logic upon the execution of which the LED is energized to show whether the lock or unlock button were depressed. However, this status indicator can only indicate the status of the remote device buttons. The LED does not show whether the vehicle's power door locks actually received the signal from the remote and energized the door locks.

U.S. Pat. No. 7,504,931, to Nguyen, is directed to a remote device that can indicate a variety of conditions about a vehicle. The remote device includes a transceiver and a display for indicating status and is in communication with a vehicle electronics system with a controller that is configured to, among other things, energize door lock actuators. To provide feedback regarding whether a command like locking the doors has been completed, the controller interrogates sensors the responses from which represent whether the command was completed. Since this arrangement requires such sensors, it increases the complexity and expense of a system for remotely confirming a locked status of a vehicle.

BRIEF DESCRIPTION OF THE DRAWINGS

The system is described with reference to the accompanying drawings. In the drawings, like reference numbers indicate identical or functionally similar elements.

DETAILED DESCRIPTION

The various embodiments of the system and their advantages are best understood by referring to FIGS. 1 through 6 of the drawings. The elements of the drawings are not necessarily to scale, emphasis instead being placed upon clearly illustrating the novel features and principles of operation. Throughout the drawings, like numerals are used for like and corresponding parts of the various drawings.

Furthermore, reference in the specification to "an embodiment," "one embodiment," "various embodiments," or any variant thereof means that a particular feature or aspect described in conjunction with the particular embodiment is included in at least one embodiment. Thus, the appearance of the phrases "in one embodiment," "in another embodiment," or variations thereof in various places throughout the specification are not necessarily all referring to its respective embodiment.

Figure 1:
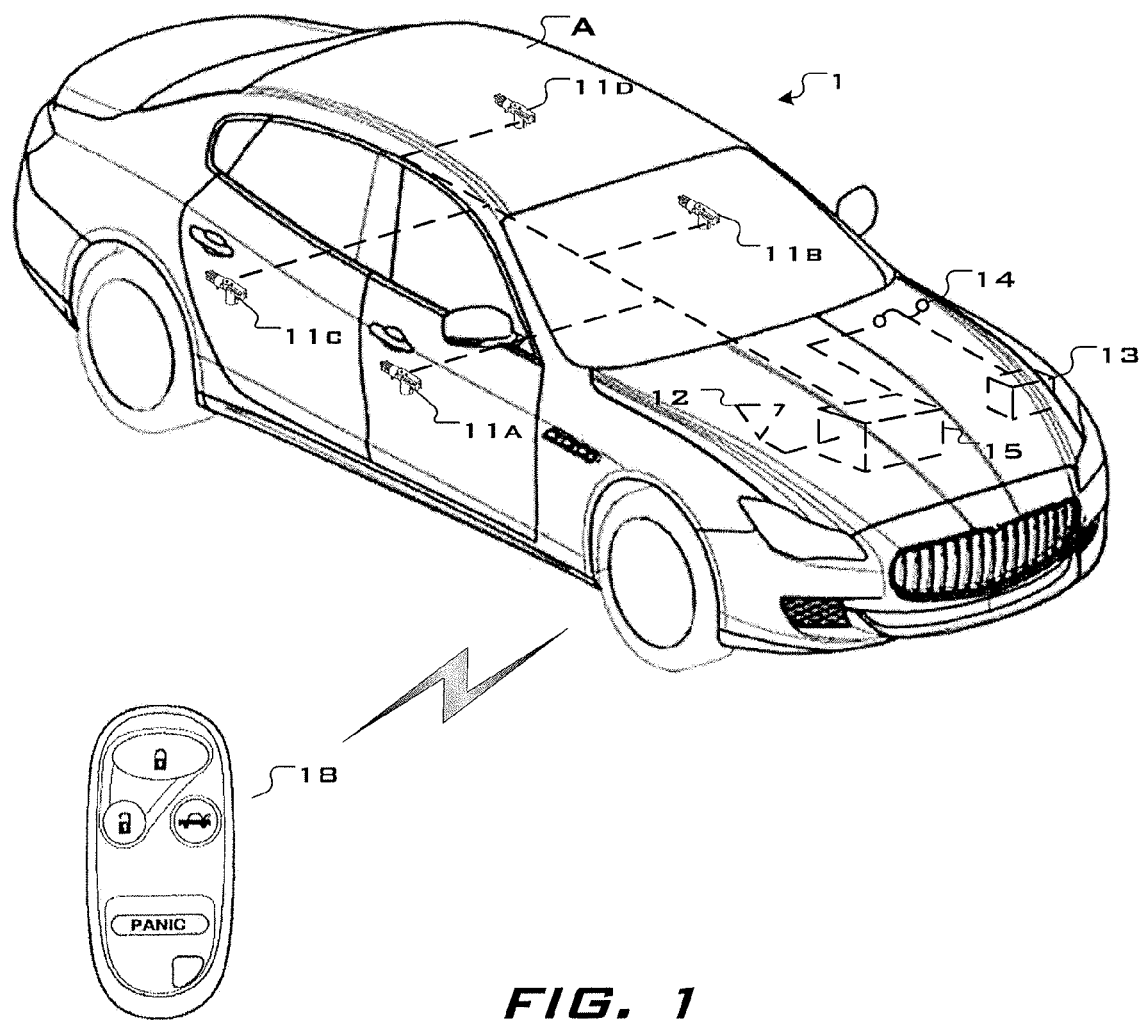
FIG. 1 is an illustration of a typical prior art power door lock system for a vehicle.

FIG. 1 illustrates a conventional remote keyless locking system 1 in a vehicle A, having a battery 13 coupling power to a system controller 15 through a fuse 14. The controller 15 is configured to apply electrical current to door lock actuators 11a-11d based upon a pre-established logic which causes locking or unlocking of the doors, either responsive to user actions while operating the vehicle A or to wireless command signals from a user remote transmitter 18, or according to other criteria such as time or proximity of the remote transmitter 18, engaging or disengaging the parking brake, etc. An antenna 12 couples wireless remote command signals to the controller 15 which is configured to execute the commands in accordance with the pre-established logic.

Figure 2:
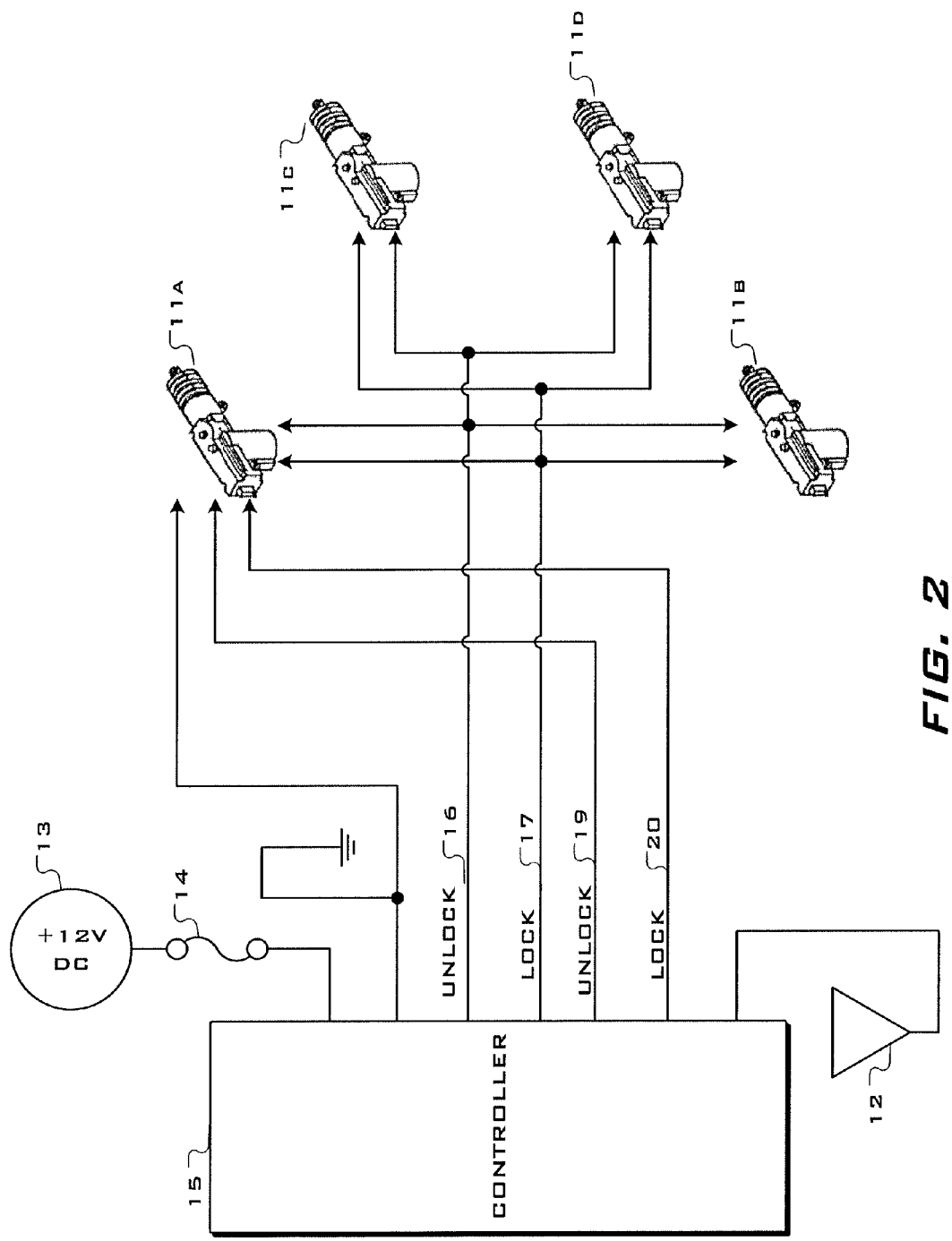
FIG. 2 is a functional schematic of an exemplary electrical system for a prior art power door lock system for a vehicle.

A schematic of such a prior art system 1 is shown in FIG. 2, where each of four door lock actuators 11a-11d (for a four door vehicle) are coupled to controller 15. Typically, leads 16, 17, 19, 20 impart current, and thus establishing voltages, from controller to actuators 11a-11d. Lead 16 couples a voltage that causes the all the actuators 11a-11d to unlock the doors, while lead 17 couples a voltage of opposite polarity to the actuators 11a-11d to lock the doors. In this example, actuator 11a is the driver door. In many vehicles today, the driver door may be unlocked alone without causing the other doors to unlock. Accordingly, such systems 1 dedicate an unlock lead 19 and a lock lead 20 to the driver door actuator 11a. Hereafter, a lead 16, 17 may be used interchangeably with the voltage that is created across such lead. In other words, an "unlock voltage" is synonymous with lead 16, and a "lock voltage" is synonymous with lead 17.

Figure 3:
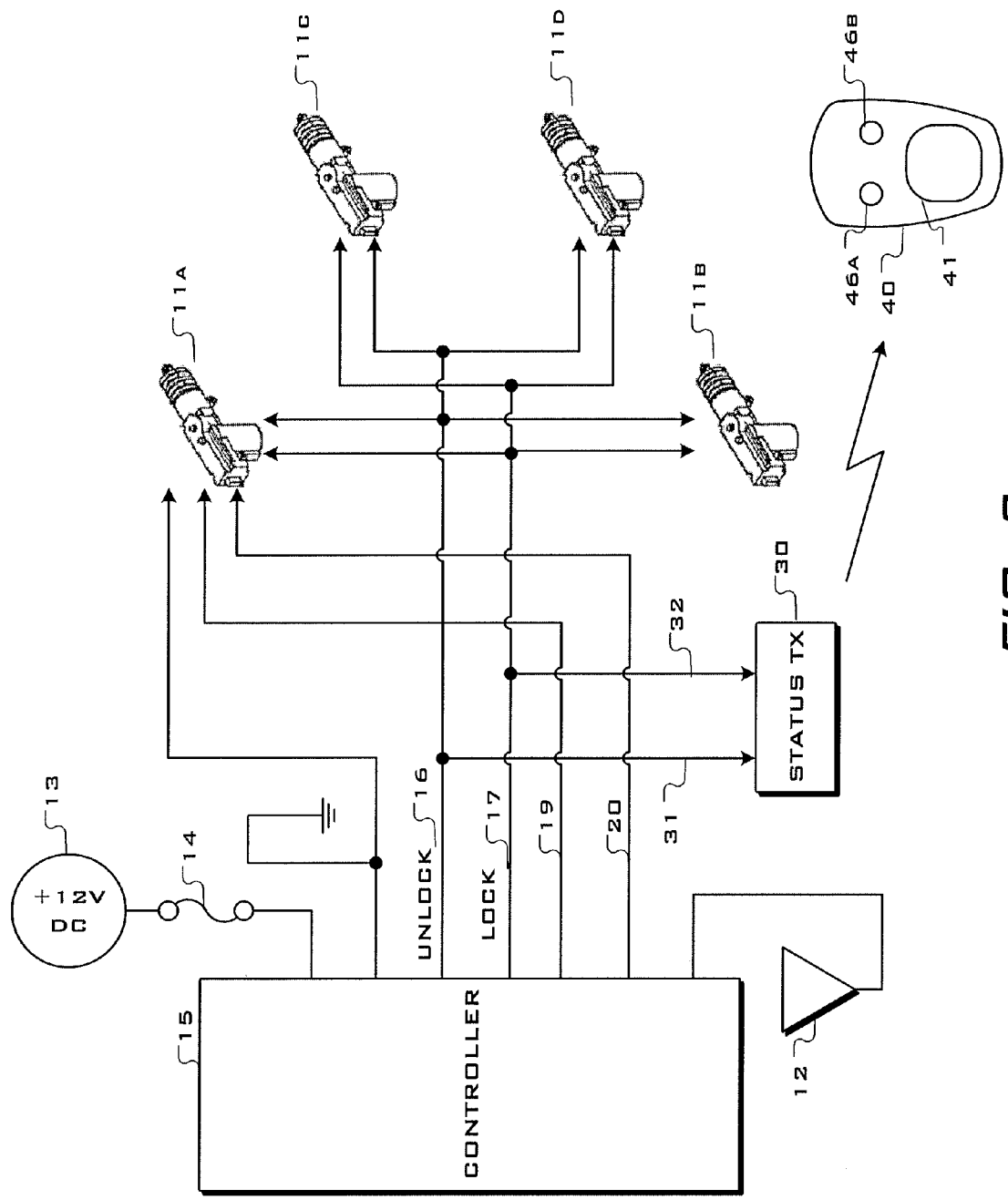
FIG. 3 is a functional schematic of the system illustrated in FIG. 2 including an exemplary system for remotely determining the locked status of a vehicle.
Figure 4:
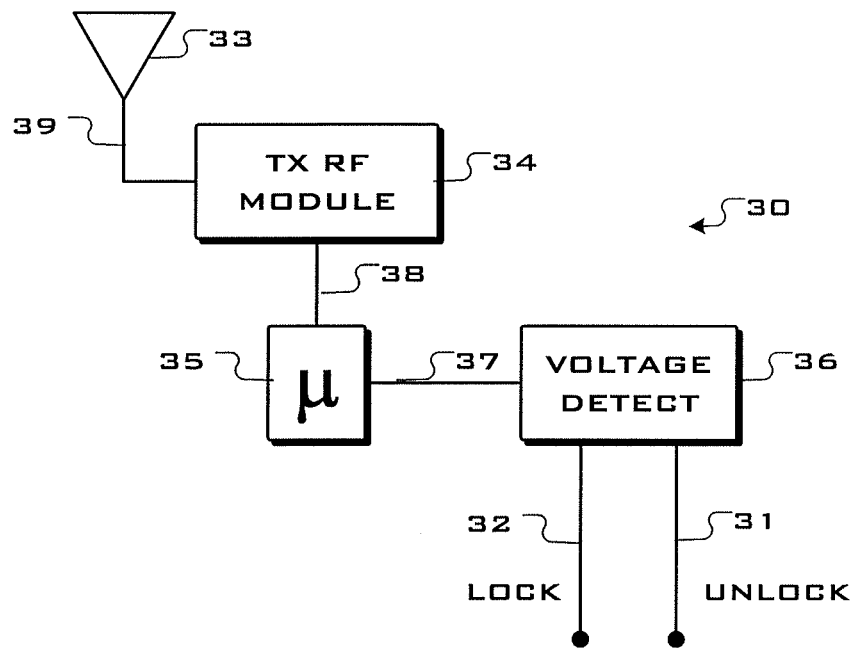
FIG. 4 is a functional schematic of an exemplary status transmitter.

Turning now to FIG. 3, an exemplary embodiment of the present system is illustrated comprising a status transmitter 30 connected to vehicle system 1 by attaching inputs 31, 32 to unlock lead 16 and lock lead 17, respectively. A remote receiver 40 is wirelessly responsive to the status transmitter 30. A functional schematic of an exemplary status transmitter 30 in FIG. 4 shows the transmitter 30 having the unlock and lock voltage inputs 31, 32. Input 31 couples the vehicle system's 1 unlock voltage 16 for all doors, and input 32 couples the lock voltage 17 for all doors to a voltage detector 36. Voltage detector 36 outputs a detected voltage signal 37 to a transmitter microcontroller 35 that is configured to convey a status signal 38 based upon the detected voltage signal 37 to a transmitter radio frequency ("RF") module 34 that outputs a modulated status signal 39 to a transmit antenna 33. Transmit antenna then couples the modulated status signal 39 to a medium, e.g., the atmosphere, through which the signal is wirelessly transmitted.

Figure 5:
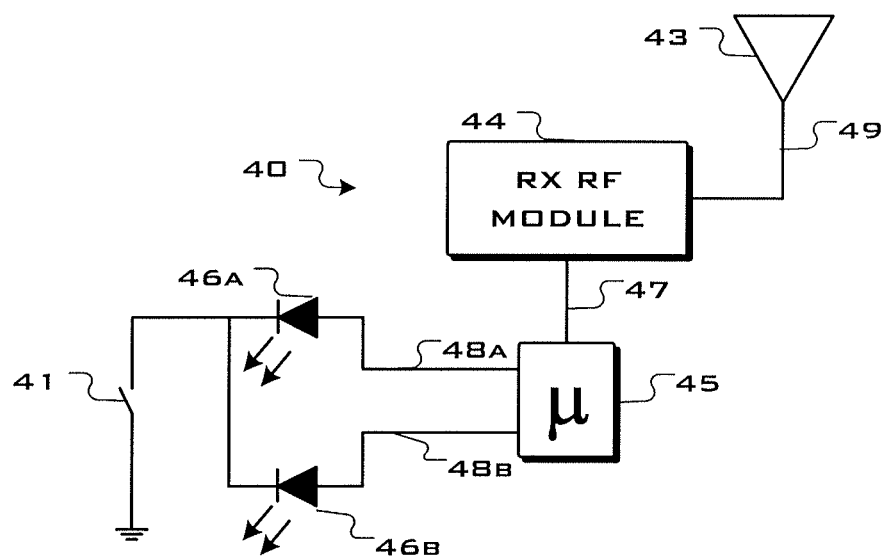
FIG. 5 is a functional schematic of an exemplary receiver responsive to the status transmitter.

A receiver 40 configured to be responsive to such a signal is illustrated in FIG. 5, comprising a receive antenna 43 which down-converts the wireless signal into a received modulated status signal 49. A receive RF module 44 demodulates the received modulated signal 49, converting it into a received status signal 47 which is input to a receiver microcontroller 45. The receiver 40 includes one or more light emitting diodes ("LEDs") 46a, 46b responsive to lock and unlock signals 48a, 48b representing lock and unlock conditions, respectively, that are output by the receiver microcontroller 45.

In operation, a user initiates a command to lock all doors by activating remote transmitter 18 which emits a wireless lock command signal. The lock command signal impinges upon the vehicle system's 1 antenna 12 which couples the signal to the system controller 15. The controller 15 then creates a lock voltage 17 representing a lock command to all actuators 11a-11d which are configured to respond to the lock voltage 17 and move to actuate the respective door locks to a locked condition. Simultaneously, the lock voltage 17 is applied across input 32 of the status transmitter 30 where the lock voltage 17 is detected by detector 36. Voltage detector 36 is configured to execute a logical process that determines whether the input voltage 31, 32 is of a polarity representative of a lock voltage 17, i.e., input 32. When the detector 36 determines the input voltage 32 does represent a lock voltage 17, the detector 36 outputs a detected voltage signal 37 that indicates a lock voltage 17 applied to all the actuators 11a-11d was detected, thereby indicating the vehicle A is locked. The detected voltage signal 37 is then input into the transmitter microcontroller 35 which is configured to execute a logical process that, upon receiving the detected voltage signal 37, outputs a status signal 38 representative of a command to receiver 40 and that is up-converted by the transmitter RF module 34 into a modulated status signal 39 according to an appropriate communications protocol (e.g., 2.4 GHz). The modulated status signal 39 is then coupled to the atmosphere through antenna 33.

In the receiver 40, receiver antenna 43 is then impinged by the signal converting it to a received, modulated status signal 49. The receiver RF module 44 down-converts the signal according to an appropriate communications protocol to a received status signal 47 that is then input to the receiver microcontroller 45. The receiver microcontroller 45 is configured to execute a logical process that determines whether the received status signal 47 is representative of a lock command. If so, the receiver microcontroller 45 outputs a lock signal 48a applied to a lock LED 46a which, when illuminated in response to such lock signal 48a, visually indicates the vehicle is in a locked status.

When user initiates an unlock command for all four doors by activating remote 18 which transmits an unlock command signal that is received by vehicle system 1. In response, an unlock voltage 16 of an opposite polarity than a lock voltage 17 is applied to the actuators 11a-11d and to receiver input 31. Voltage detector 36 is configured to execute a logical process to determine whether the detected voltage 31 is representative of a lock command. In this case, the result is the input voltage 31 does not represent a lock command. A detected voltage signal 37 representative of an unlocked condition is conveyed to the transmitter microcontroller 35 which executes a logical process to issue a status signal 37 representative of an appropriate command to the receiver 40. The status signal 37 is modulated by the transmitter RF module 34 and the modulated signal 39 is emitted via antenna 33.

The receiver 40 again receives the transmitted signal through the receive antenna 43 and a received modulated signal 49 is down-converted by receiver RF module 44 into a received status signal 47. The receiver microcontroller 45 is configured to execute a logical process that determines whether the received status signal 47 is representative of a lock command. In this case, the receiver microcontroller 45 outputs an unlock signal 48b applied to an unlock LED 46b which, when illuminated in response to such unlock signal 48b, visually indicates the vehicle is in an unlocked condition.

In one embodiment, receiver 40 may include a switch 41, which may be adapted to be operated by depressing a status check button (see FIG. 3), that when closed causes the receiver microcontroller 45 to apply an lock signal 48a or an unlock signal 48b to illuminate the appropriate LED 46a, 46b, depending upon whether the last signal received from the transmitter 30 indicated a lock condition or not. Accordingly, it will be apparent that receiver microcontroller 45 may be configured with a computer-readable memory that will store data representative of the most recent lock status signal indication received, the most recent unlock command detected. Further, microcontroller 45 may be configured with control logic causing it to execute a logic process that when switch 41 is closed, microcontroller 45 outputs a lock or unlock signal 48a, 48b according to the most recent status signal received from transmitter 30 causing the appropriate LED 46a, 46b to illuminate. Thus, a user may determine whether the vehicle is locked or unlocked. In light of the above description, it will be appreciated that LEDs 46a, 46b may be different colors, e.g., LED 46b may be red to indicate an unlocked condition and LED 46a may be green to indicate a locked status.

Figure 6:
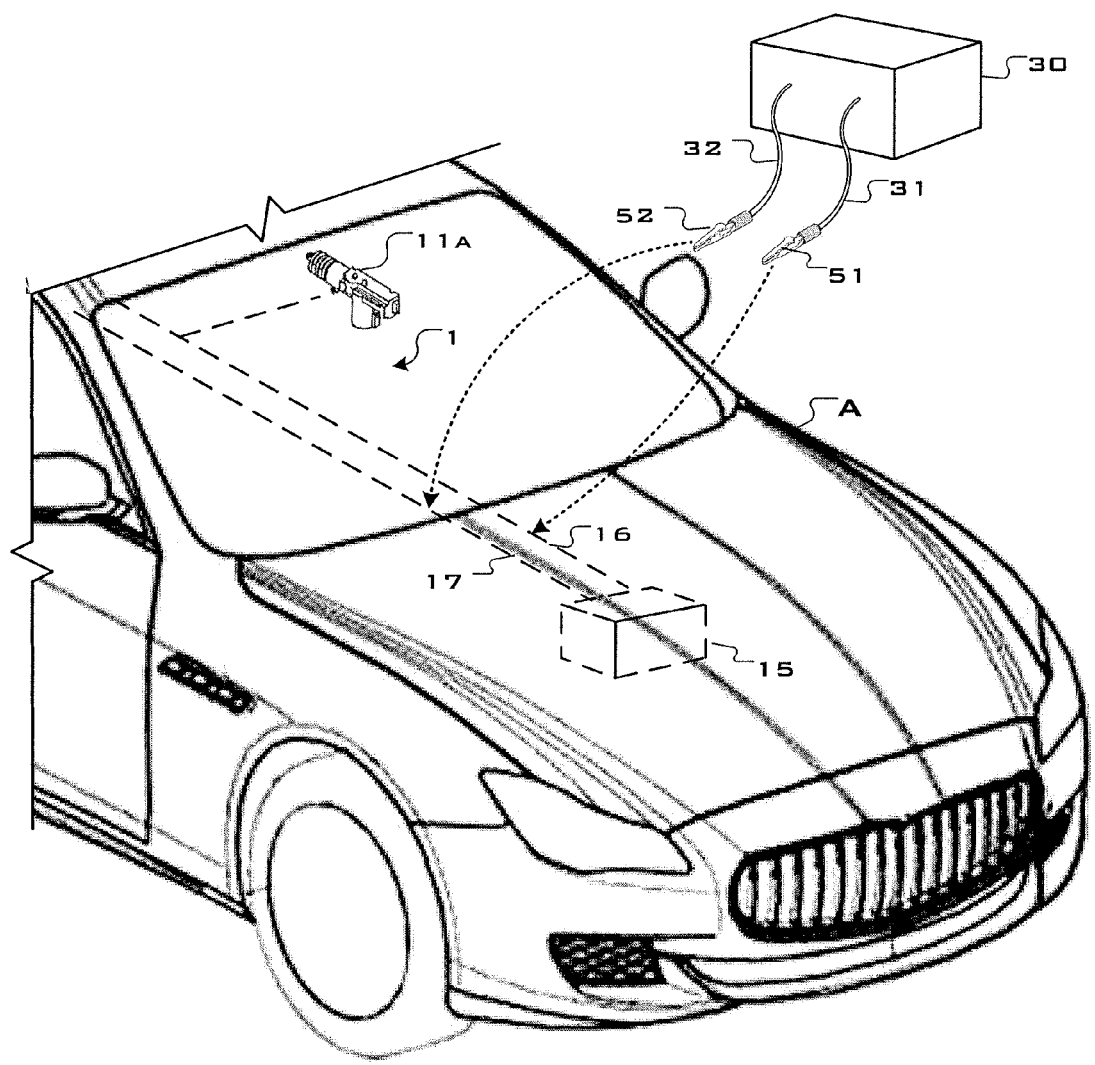
FIG. 6 depicts a possible embodiment of the system.

The status transmitter 30 described above may be adapted in a variety of forms. The vehicle door lock system 1 may be configured with the transmitter 30 in the factory. Alternatively, a transmitter 30 according to the above description may be installed as an adjunct to a pre-existing system 1. In this case, transmitter inputs 31, 32 may be coupled to the unlock/lock voltage leads 16, 17, respectively, with electrical clamps 51, 52, such as clamp probes, as illustrated in FIG. 6. An advantage of using clamps 51, 52 is they allow measurement of current or voltage in conductors, i.e., leads 16, 17, without having to make physical contact with them or disconnecting them and then splicing in the inputs 31, 32. Consequently, the status transmitter 30 may be installed in a vehicle pre-existing power door lock system 1 without disconnecting the leads 16, 17 between the system controller 15 and the actuators 11a-d and then reconnecting them to incorporate the transmitter input leads 31, 32.

As described above and shown in the associated drawings, the present invention comprises a system for remotely insuring locked status of a vehicle. While particular embodiments have been described, it will be understood, however, that any invention appertaining to the system described is not limited to such embodiments, since modifications may be made by those skilled in the art, particularly in light of the foregoing teachings. It is, therefore, contemplated by the appended claims to cover any such modifications that incorporate those features or those improvements that embody the spirit and scope of the invention.

What is claimed is:

1. A system for detecting locked status of a vehicle, said vehicle having an electrical power door lock system, said system for detecting comprising:
    a status transmitter configured to transmit a signal indicating said vehicle is in a locked status and having first input for coupling a lock voltage from said power door lock system, said lock voltage representative of a command to lock all vehicle doors; and
    a remote receiver responsive to said status transmitter and configured to indicate whether said vehicle is in the locked status based upon said signal;
    wherein said status transmitter further comprises a voltage detector coupled to said first input and configured to detect the polarity of said lock voltage;
    a second input to said status transmitter for coupling an unlock voltage from said power door lock system, said unlock voltage representative of a command to unlock all vehicle doors; and
    wherein said voltage detector is coupled to said second input and is configured to detect the polarity of said unlock voltage.

2. The system for detecting locked status of a vehicle of claim 1, wherein said status transmitter is adapted to connect to a pre-existing electrical power door lock system in a vehicle.

3. The system for detecting locked status of a vehicle of claim 2, wherein said first input comprises an electrical clamp for connecting said first input to said pre-existing system without making physical contact with any conductor comprised in said pre-existing system.

4. The system for detecting locked status of a vehicle of claim 2, wherein each of said first and second inputs comprise an electrical clamp for connecting each of said first and second inputs to said pre-existing system without making physical contact with any conductor comprised in said pre-existing system.

5. A system for detecting locked status of a vehicle having a power door lock subsystem, said system for detection system comprising:
    a transmitter comprising:
        first and second inputs configured to be respectively connected to first and second leads in said power door lock subsystem, said first and second inputs, when so connected, respectively comprising a lock voltage representing a command to said power door lock subsystem to lock all vehicle doors and an unlock voltage representing a command to said power door lock subsystem to lock all vehicle doors;
        a voltage detector responsive to said first and second inputs and configured to detect the polarity of said lock and unlock voltages and outputting a signal representing said polarity;
        a transmitter controller configured to receive said signal and to output a status signal representing either one of a locked status and an unlocked status of said vehicle;
        a radio frequency module for wirelessly transmitting said status signal.

6. The system for detecting locked status of a vehicle of claim 5, further comprising:
    a remote receiver responsive said transmitter and comprising:
        a radio frequency module compatibly configured to receive said status signal;
        a receiver controller configured to issue a command signal based upon whether the status signal represents either one of said locked status and said unlocked status;
        a display responsive to said command signal configured to visually indicate either one of said locked status and said unlocked status based upon said command signal.

7. The system for detecting locked status of a vehicle of claim 6, wherein said status transmitter is configured to be non-integrally added to a pre-existing power door lock subsystem.

8. The system for detecting locked status of a vehicle of claim 7, wherein said status transmitter is configured to be non-integrally added to said pre-existing power door lock subsystem without making physical contact with any conductors comprised within said subsystem.

9. The system for detecting locked status of a vehicle of claim 8, further comprising electrical clamps terminating each of said first and second inputs and configured to clamp around said first and second leads.

* * * * *